US012311385B1

(12) United States Patent
Furrer et al.

(10) Patent No.: US 12,311,385 B1
(45) Date of Patent: May 27, 2025

(54) ELECTROMAGNETIC SEPARATION OF POWDERS

(71) Applicant: RTX Corporation, Farmington, CT (US)

(72) Inventors: David U. Furrer, Marlborough, CT (US); Sergei F. Burlatsky, West Hartford, CT (US); Iuliana Cernatescu, Glastonbury, CT (US); Andrew J. Boyne, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/415,361

(22) Filed: Jan. 17, 2024

(51) Int. Cl.
*B03C 1/033* (2006.01)
*B03C 1/30* (2006.01)

(52) U.S. Cl.
CPC .............. *B03C 1/0335* (2013.01); *B03C 1/30* (2013.01); *B03C 2201/20* (2013.01)

(58) Field of Classification Search
CPC ...... B03C 1/0335; B03C 1/30; B03C 2201/20
See application file for complete search history.

(56) References Cited

U.S. PATENT DOCUMENTS 6,355,178 B1 * 3/2002 Couture .................... B04C 9/00 210/695
11,065,690 B2 7/2021 Chir et al.
2019/0176234 A1 6/2019 Heard et al.

FOREIGN PATENT DOCUMENTS

CN 109095216 B 4/2021
CN 213857068 U 8/2021

* cited by examiner

*Primary Examiner* — Jacob S. Scott
*Assistant Examiner* — Miraj T. Patel
(74) *Attorney, Agent, or Firm* — CANTOR COLBURN LLP

(57) ABSTRACT

An electromagnetic field separation system for separation of metallic powders including a sample introducer, wherein the sample to be introduced comprises particles; a first separator, wherein the first separator is configured to provide a differential charge to the particles of the sample; an electromagnetic separation stage comprising a second separator, wherein the second separator provides an electromagnetic field configured to separate the particles of the sample; and a recovery stage.

19 Claims, 8 Drawing Sheets

ELECTROMAGNETIC SEPARATION OF POWDERS

BACKGROUND

The subject matter disclosed herein generally relates to the electromagnetic separation of contaminants from metallic powders.

Metal powders are used in many applications, for example, applications in the aerospace industry include nickel-based superalloy turbine engine disks and a range of metallic alloys for additive manufacture. Cleanliness of these powders can impact the performance of the final manufactured components. As the manufacture of metal powders starting materials generally involves various handling and processing steps, each step can potentially introduce contamination in the form of non-metallic oxides, complex inorganic compounds, and organic compounds. In addition to the original manufacture of powders, there is also a need to maintain the cleanliness of powders from additive manufacturing processes that are processed through a recycle path (such as unmelted powders that are reclaimed and re-used in future build campaigns).

Current methods of controlling cleanliness of as-produced metal powder include sieving through screens of known and controlled sizes, or quality monitoring via acid digestion, image analysis, and so forth. Drawbacks of the existing methods include inefficiencies and insufficient analysis. For example, the techniques of acid digestion and image analysis can be used to assess the cleanliness of a metal powder for quality assurance purposes but these techniques do not provide the capability for separation of unwanted materials from a powder. Sieving can provide control of cleanliness by removal and separation of unwanted particles on the basis of size, In this manner, sieving can provide a means of controlling the maximum size of contaminants that can be introduced into the metallic powder. For sieving techniques, the chemistry of the powder starting material and its contaminants rely on the control of the materials used to produce the powder and the materials in which the powder is permitted to encounter and contact throughout processing. Furthermore, sieving does not generally affect the quantity of foreign material entering the metallic powder, nor does it control the size of final resultant defects formed during manufacture. Therefore, organic particles can decompose into gaseous, reactive, or mobile materials that can react with the metallic powder and contaminate a large volume of the final product.

A need remains for a method to separate contaminants from metallic powders.

SUMMARY

An electromagnetic field separation system for separation of metallic powders including a sample introducer, wherein the sample to be introduced comprises particles; a first separator, wherein the first separator is configured to provide a differential charge to the particles of the sample; an electromagnetic separation stage comprising a second separator, wherein the second separator provides an electromagnetic field configured to separate the particles of the sample; and a recovery stage.

In one aspect, the first separator is incorporated with the sample introducer.

In another aspect, the first separator provides the differential charge by friction, conduction, induction, or a combination thereof.

In yet another aspect, the first separator is configured to provide the differential charge by tribostatic charging, corona charging, or a combination thereof.

In yet another aspect, the system includes a cyclone separator.

In yet another aspect, the system includes a discharging stage, wherein the discharging stage is incorporated with the first separator, or after the first separator.

In yet another aspect, the discharging stage includes a grounded wall.

In yet another aspect, the system includes a vacuum pump capable of providing a reduced pressure of about 0.0001 Pascals to about 100,000 Pascals.

A method to separate contaminants from metallic powder including introducing a sample comprising particles to an electromagnetic field generating system, wherein the electromagnetic field generating system includes a first separator, wherein the first separator is configured to provide a differential charge to the particles of the sample, an electromagnetic separation stage including a second separator, wherein the second separator provides an electromagnetic field, and a recovery stage; subjecting the sample to differential charging by the first separator to provide differentially charged particles; and subjecting the differentially charged particles to an electromagnetic field generated by the second separator, wherein the electromagnetic field provides electromagnetic separation of the differentially charged particles, wherein the differentially charged particles undergo the electromagnetic separation based on their electrostatic charge states, their paramagnetic properties, their ferromagnetic properties, or a combination thereof.

In one aspect, the electromagnetic field is tuned to improve separation for a selected particle size and/or a sample type.

In another aspect, the differentially charged particles include organic contaminants and the organic contaminants are removed from the differentially charged particles to provide a final material with less than 0.01 parts per million of the organic contaminants.

In yet another aspect, the contaminants are off-chemistry metallic particles, non-metallic particles, or a combination thereof.

In yet another aspect, the sample is introduced by a moving conveyor belt, a feed tube, a static surface, or a combination thereof.

In yet another aspect, the subjecting the sample to differential charging by the first separator to provide the differentially charged particles and the subjecting the differentially charged particles to an electromagnetic field generated by the second separator; are performed in air, under an inert atmosphere, under a reduced pressure, or a combination thereof.

In yet another aspect, the inert atmosphere is nitrogen, argon, or a combination thereof, wherein the reduced pressure is partial vacuum of 1,000 Pascals to 100,000 Pascals, wherein the reduced pressure is a full vacuum of 0.0001 Pascals to 0.01 Pascals.

In yet another aspect, the electromagnetic field generating system further includes a cyclone separator, wherein the cyclone separator provides separation of the particles or separation of the differentially charged particles with air flow forces and electrostatic forces, wherein the cyclone separator provides the separation of the particles or the separation of the differentially charged particles before, after, or during the subjecting of the differentially charged particles to the electromagnetic field generated by the second separator.

In yet another aspect, the electromagnetic field generating system further includes a gas impingement system, wherein the gas impingement system supplies a flow of inert gas in a first direction, wherein the first direction is in an opposing direction to a direction of a powder particle flow, wherein the gas impingement system provides an increased residence time in the system for the differentially charged particles during the subjecting of the differentially charged particles to the electromagnetic field.

In yet another aspect, the electromagnetic field generating system further includes a discharging stage, wherein subjecting the differentially charged particles to the discharging stage provides a mixture of partially discharged particles and charged particles and provides separation of the partially discharged particles and the charged particles.

In yet another aspect, the discharging stage provides separation of the partially discharged particles and the charged particles prior to or during electromagnetic separation.

In yet another aspect, the method further includes separating the particles of the sample by sieving before introducing the sample to an electromagnetic field; separating the differentially charged particles by sieving during electromagnetic separation; or separating the particles of the sample by sieving after electromagnetic separation.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Disclosed herein is a system for separation of metallic powders and a method to separate contaminants from metallic powder. The system and the method provide the means to provide high purity metallic powders for manufacturing of components. The disclosed method can ensure the removal of contaminants from a metallic powder sample provides a material of sufficient purity to minimize and/or eliminated defects within manufactured components. The method is particularly suited to metal powders used in the aerospace industry and for additive manufacture. The separation and removal of off-chemistry and non-metallic particles from a subject metal powder sample can be achieved with the disclosed method and system. In addition to providing a method and system for separation of the metallic powders, the method and system can be adapted to provide characterization of contaminants within the metallic powder. Furthermore, the disclosed method and system can be tailored to accommodate the separation of different particle sizes and different metal powder types.

Figure 1:
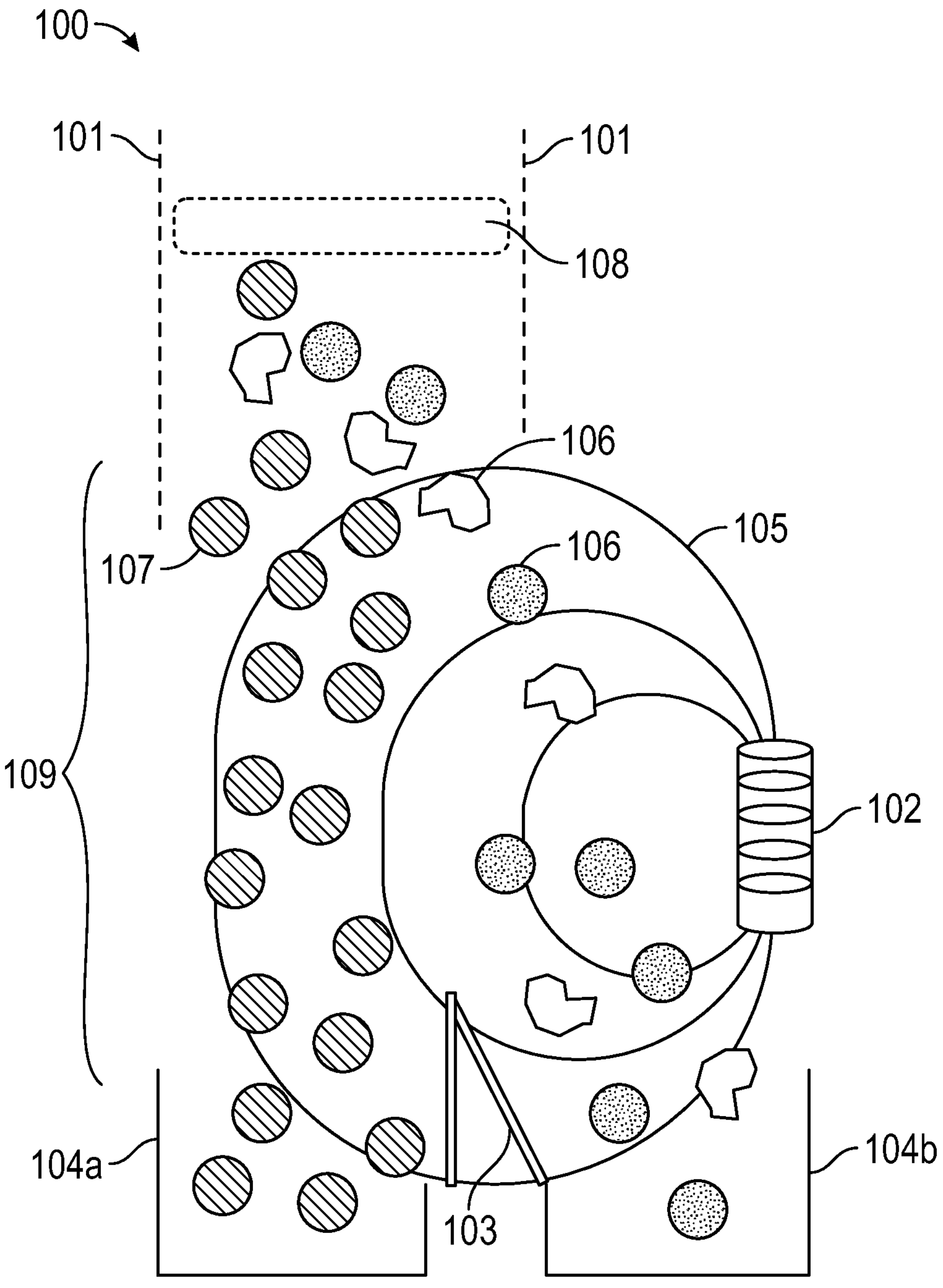
FIG. 1 is a schematic diagram of an embodiment of an electromagnetic field separation system for the separation of metallic powders.

An embodiment of the electromagnetic field separation system 100 (herein after system 100) is shown in FIG. 1. The system 100 includes a sample introducer 101, a first separator 108, an electromagnetic separation stage 109 with a second separator 102 that provides an electromagnetic field 105. A physical separator 103 serves to further separate a sample into a recovery stage (104*a* and 104*b*). During use of the system 100, a metallic powder sample comprising metallic particles 107 and non-metallic particles 106 can be separated by the electromagnetic field 105 on the basis of their electrostatic charge states, their paramagnetic properties, their ferromagnetic properties, or a combination thereof. Metallic particles 107 can be directed by the system into the recovery stage 104*a* and the non-metallic powders 106 can be directed into the recovery stage 104*b*. The first separator 108 can be incorporated into and part of the sample introducer 101.

The sample introducer 101 can be a moving conveyor, a feed tube, or a combination thereof. The sample introducer 101 can serve to provide tribostatic charging of the metal powder sample. The sample introducer 101 can incorporate vibratory motion to enhance the tribostatic charging. When the sample introducer 101 is a feed tube, the feed tube can be composed of stainless steel, Ni-base alloys, alumina, or a combination thereof. The interior of the feed tube can coated with or made from suitable materials to facilitate and increase triboelectric charge transfer. Suitable materials for the internal coating can include tungsten carbide, titanium nitride, alumina, or a combination thereof. The materials for the internal coating are selected to minimize or eliminate attrition of the coating into the test powder during use of the system. For example, the internal coating can have an erosion resistance of 0.01 cubic millimeters per gram ($mm^3$/g) to 0.05 $mm^3$/g as measured in accordance with ASTM G76.

Figure 2:
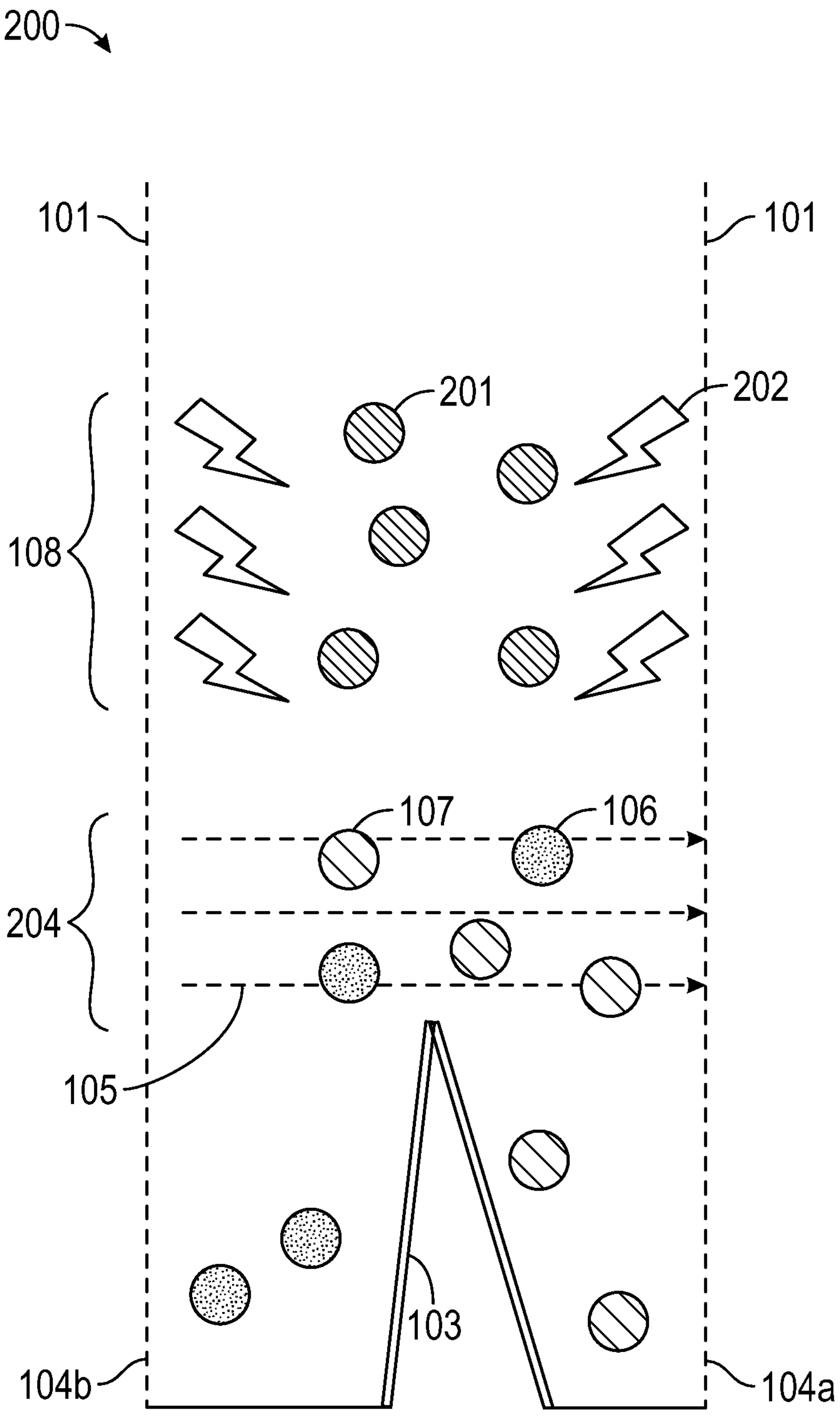
FIG. 2 is a schematic diagram of an embodiment of an electromagnetic field separation system for the separation of metallic powders.

In an embodiment, the system 100 can include corona discharge 202 for the first separator 108 (stage 200). As shown in FIG. 2, the corona discharge 202 can be applied to the sample particles 201 to provide differential charges on the surfaces of the sample particles 201. The resultant differentially charged particles can include charged particles and uncharged particles. The differentially charged particles can then be passed through the electromagnetic separation stage 204. The electromagnetic field 105 can serve to separate the particles on the basis of their differential charge into the recovery stage. The first separator is configured to provide a differential charge to sample particles by friction, conduction, induction, or a combination thereof. For example, the first separator 108 can include a combination of corona discharge, tribostatic charging, or air flow forces (e.g., a cyclone separator).

Figure 3A:
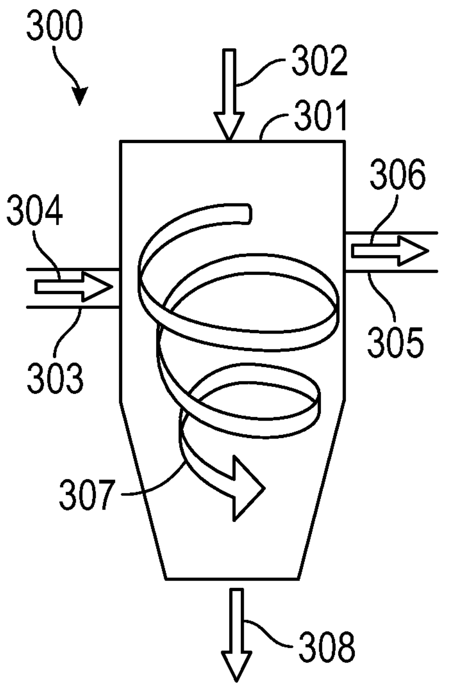
FIGS. 3A and 3B are schematic diagrams of an embodiment of a cyclone separator.
Figure 3B:
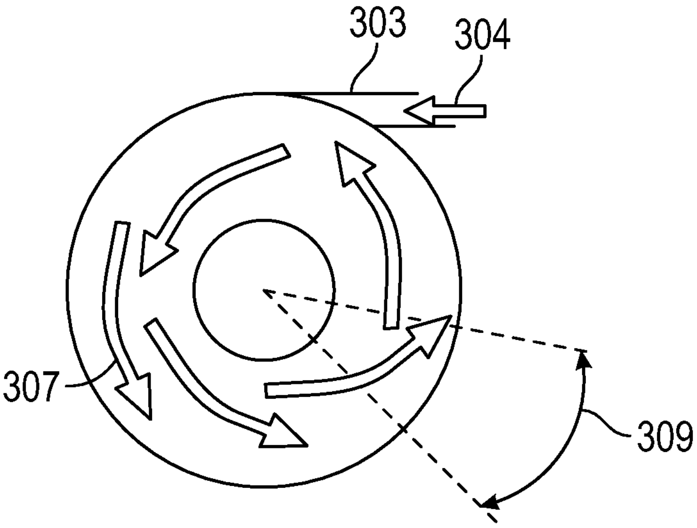

As shown in FIGS. 3A and 3B, the system 100 can further include a cyclone separator 300. The cyclone separator includes an air inlet 303 and an air outlet 305. The arrows 304 and 306 indicate the direction of air flow. Within the body of the cyclone 301, the sample is introduced as indicated by arrow 302. The forces of the air flow and electrostatic forces drive the separation of particles in the sample as the sample travels in the direction indicated by arrow 307 and exits as indicated by arrow 308. FIG. 3B provides a top view of the flow of material within the cyclone, where a position angle (theta) is indicated by label 309. Within the cyclone 300, separation of the sample can be governed by competition of the drag force of the radial velocity directed to the center and the electrostatic and centrifugal forces directed to the walls of the cyclone. The cyclone 300 can be used to enhance the effectiveness of the separation based on the electrostatic properties and densities of the sample particles flowing through the cyclone. The cyclone 300 can be integrated into the system 100 before the electromagnetic separation stage 109

Figure 4:
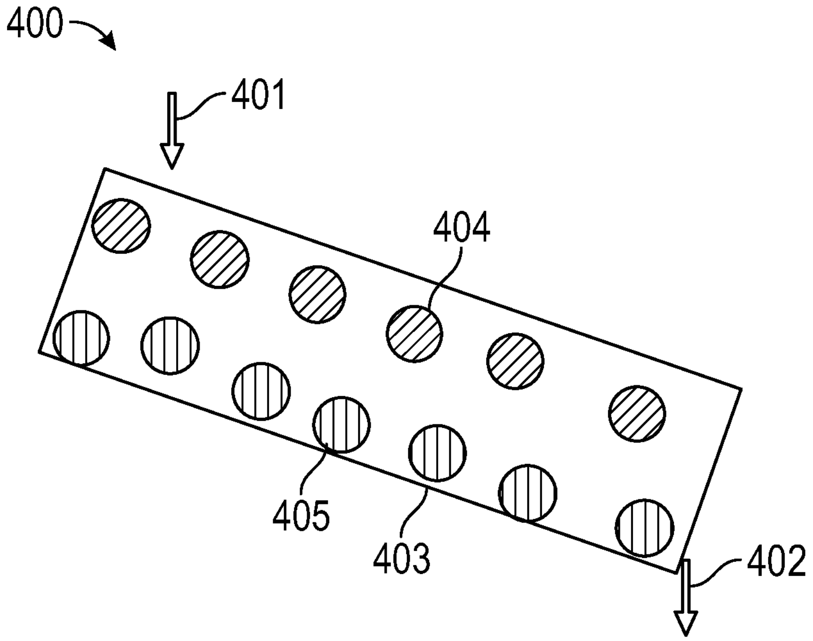
FIG. 4 is a schematic diagram of an embodiment of a discharging stage.

The system 100 can further comprise a discharging stage 400. As shown in FIG. 4, the discharging stage can be provided in a conduit, with entry and direction of particle flow shown by arrows 401 and 402. At arrow 401, the sample enters the discharging stage. The sample comprises a mixture of charged non-metallic particles (e.g., ceramics, organic compounds, and so forth) and charged metallic particles. After entry into the discharging stage, the charged metallic particles are discharged proportional to their dwell time on grounded wall 403 to provide differentially discharged metallic particles 405. The charged non-metallic particles 404 remain charged within the discharge stage and the particles flow towards the electromagnetic separation stage 109 of the system 100. The discharging stage can be combined with one or more additional separation techniques to further enhance the separation of the sample particles. Additional separation techniques include corona discharge, tribostatic charging, or air flow forces. In some embodiments, the discharging stage can be incorporated into the first separator or after the first separator. For example, when the discharging stage is combined with a first separator configured for corona discharge, the grounded wall can serve as one electrode for corona discharge.

The system 100 can include a vacuum pump capable of providing a reduced pressure of about 0.0001 Pascals (Pa) to about 100,000 Pa. In some embodiments the system is operated under air, under an inert atmosphere, under a reduced pressure, or a combination thereof. The inert atmosphere can be nitrogen, argon, or a combination thereof. The reduced pressure can be a partial vacuum of 1,000 Pa to 100,000 Pa and the reduced pressure can be a full vacuum of 0.0001 Pa to 0.01 Pa.

Figure 5:
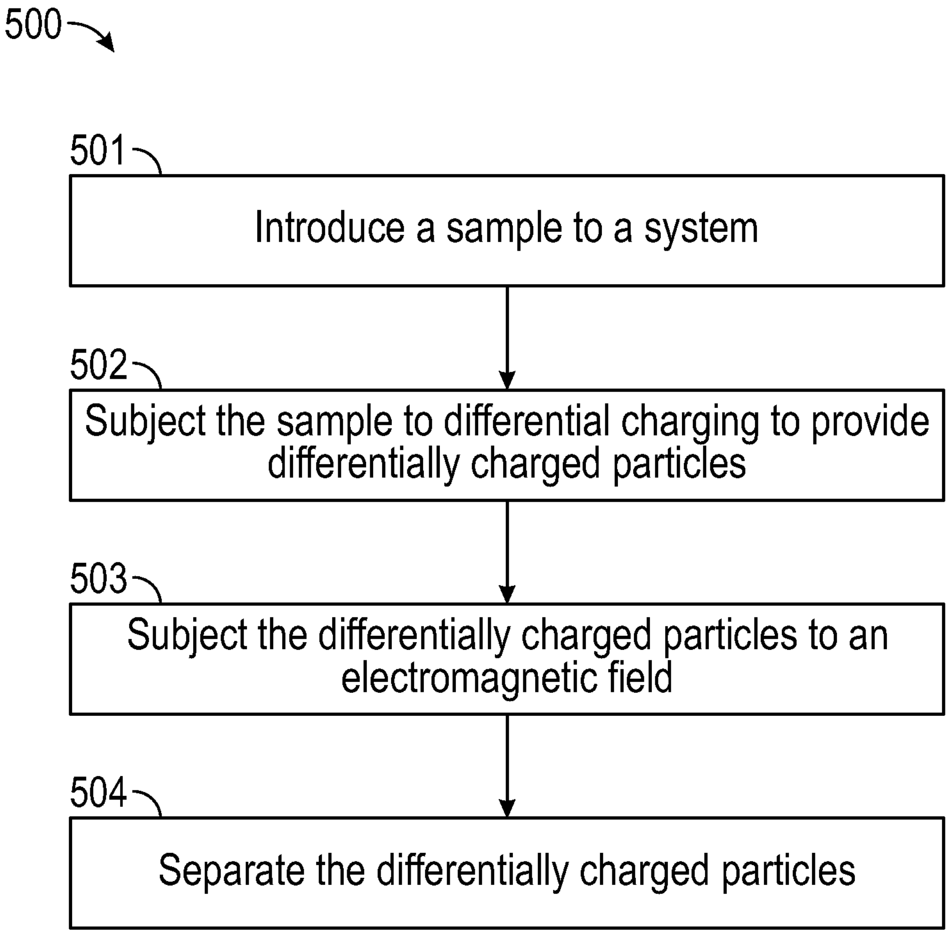
FIG. 5 is a flow diagram illustrating an embodiment of a method to separate differentially charged particles.

FIG. 5 provides an embodiment of a method 500 (hereinafter method 500) to separate contaminants from metallic powder. The method 500 can be initiated by introducing a sample including particles to a system (step 501). The system can be an embodiment of system 100. In step 502, the sample is subjected to differential charging by the first separator to provide differentially charged particles. The differentially charged particles are subjected to an electromagnetic field as the electromagnetic separation stage (step 503), and the differentially charged particles are separated by the electromagnetic field (step 504). In step 504, the differentially charged particles can be separated by the electromagnetic field on the basis of their electrostatic charge states, their paramagnetic properties, their ferromagnetic properties, or a combination thereof. If desired, the electromagnetic field can be tuned to improve the separation, such as adjustments for a selected particle size and/or a sample type. The sample can be introduced by a moving conveyor belt, a feed tube, or a combination thereof.

The metallic powder samples to be separated can include the on-chemistry metallic particles, off-chemistry metallic particles, ceramics, and/or organic compounds. Contaminants include the off-chemistry metallic particles, ceramics, and organic compounds. After separation with the method 500, the resultant metal powder material can be of high purity. For example, the resultant metal powder material can have less than 0.01 parts per million (ppm) of an organic contaminant and less than 100 ppm of an inorganic ceramic contaminant. Articles that are additively manufactured from metal powder can have defects, such as pores and voids. The defects can occur due to the presence of inorganic ceramic, non-reactive contaminants and/or organic, reactive contaminants. The cleaned metal powder resulting from the disclosed method 500 can provide additively manufactured metal parts with porous defects of less than 0.5% or less than 0.1% as measured in accordance with ASTM D792.

The subjecting of the sample to differential charging by the first separator to provide the differentially charged particles and the subjecting of the differentially charged particles to an electromagnetic field generated by the second separator; can be performed in air, under an inert atmosphere, under a reduced pressure, or a combination thereof. The inert atmosphere can be nitrogen, argon, or a combination thereof. The reduced pressure can be a partial vacuum of 1,000 Pa to 100,000 Pa and the reduced pressure can be a full vacuum of 0.0001 Pa to 0.01 Pa.

The method 500 can further include a cyclone separator within the electromagnetic field generating system. The cyclone separator can provide separation of the particles or separation of the differentially charged particles with air flow forces and electrostatic forces. The cyclone separator can provide the separation of the particles or the separation of the differentially charged particles before, after, or during the subjecting of the differentially charged particles to the electromagnetic field generated by the second separator.

The method 500 can further include a gas impingement system within the electromagnetic field generating system. The gas impingement system can supply a flow of inert gas (e.g., argon, nitrogen, helium, and so forth) in a first direction, wherein the first direction is in an opposing direction to a direction of a powder particle flow. "Opposing direction", as used herein, refers to a direction that is orientated 90 to 270 degrees from the direction of the sample flow. The gas impingement system can serve to increase the residence time in the system for the differentially charged particles while the differentially charged particles are subjected to the electromagnetic field or during other stages within the system, such as while the differentially charged particles are subjected to a discharging stage.

The method 500 can further include a discharging stage within the electromagnetic field generating system. The differentially charged particles can be subjected to the discharging stage to provide a mixture of partially discharged particles and charged particles provides. The discharging stage and facilitate and enhance the separation of the partially discharged particles and the charged particles prior to or during the electromagnetic separation stage.

The method 500 can be used in combination with a sieving process. The sieving process can be used to remove particles larger than the sieve mesh openings used during sieving. The method 500 can be used before, during, or after a sieving process.

Figure 6:
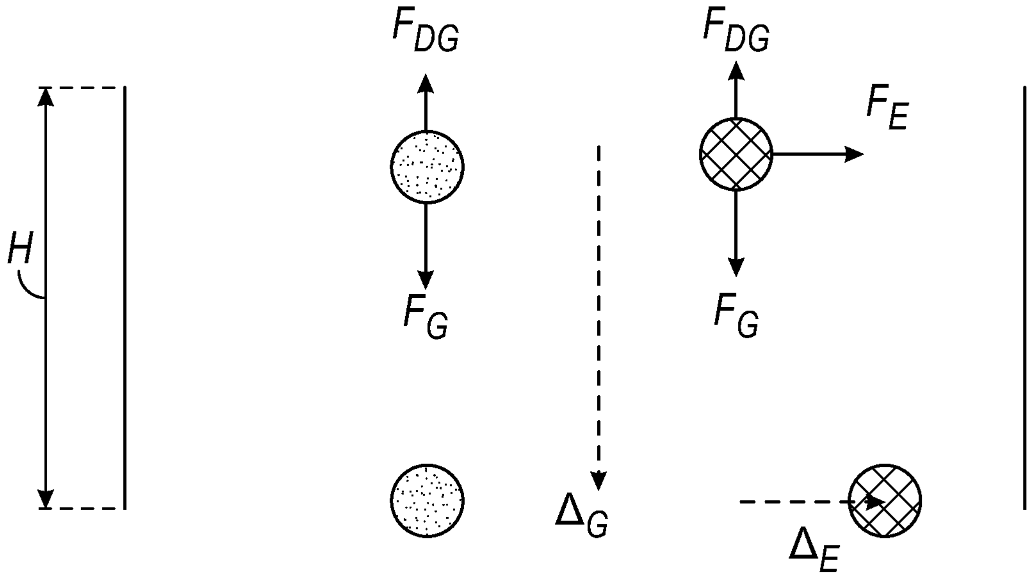
FIG. 6 is a schematic diagram of a model of electrostatic particle separation.

The method 500 can further include mathematical modeling to tailor the method to accommodate the separation of a select particle size and/or different metal powder types. For reference, a model of electrostatic separation of differentially charged particles in a magnetic field is provided in FIG. 6. As shown in FIG. 6, the magnetic field strength H differentially affects the behavior of the differentially charged particles. Equations 1 to 3 are provided for mathematical modeling of the electrostatic behavior of the differentially charged particles.

The modeled force can be calculated with equation (1):

$$\vec{F}=\vec{g}\,m_p+q_p\vec{E}-6\pi\eta d_p v_y \quad (1),$$

where $\vec{g}$ is the gravitational acceleration constant, $m_p$ is the mass of the particle, $q_p$ is the charge of the particle, $\vec{E}$ is the electric field strength, $\eta$ is the viscosity of air, $d_p$ is the diameter of the particle, and $v_y$ is vertical component of the particle velocity.

The acceleration of the particles can be calculated with equation (2):

$$\vec{a}=\frac{F}{m_p}, \quad (2)$$

where $\vec{a}$ is acceleration, $\vec{F}$ is net force on the particle, and $m_p$ is mass of the particle.

The particle charge can be calculated with equation (3):

$$q_p=3\pi\epsilon_0 d_p^2 E_c\left(\frac{\epsilon_r}{\epsilon_r+2}\right), \quad (3)$$

where $\in_0$ is the vacuum permittivity constant, $d_p$ is the particle diameter, $E_c$ is the magnitude of the electric field, and $\in_r$ is the dielectric permittivity of the particle.

Figure 7:
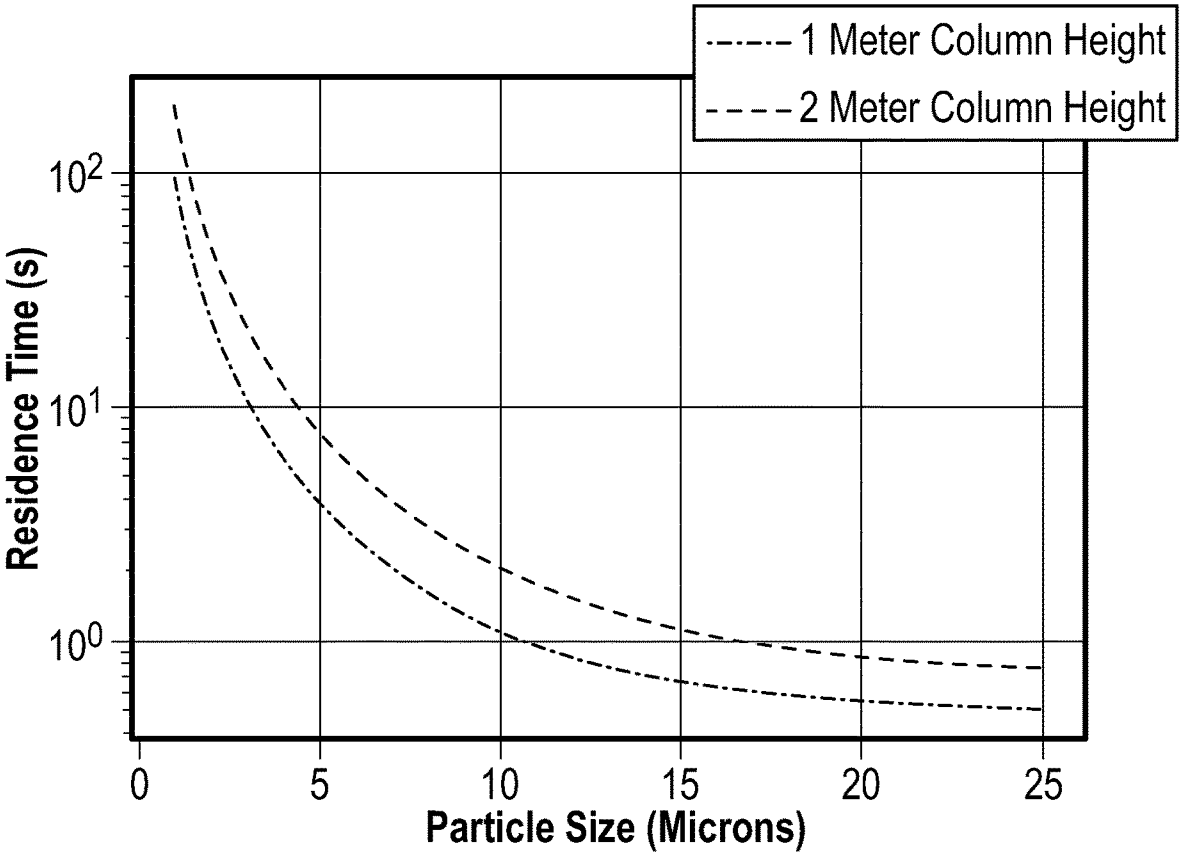
FIG. 7 is a graph of the predicted residence time (seconds) versus particle size (micrometers)
Figure 8:
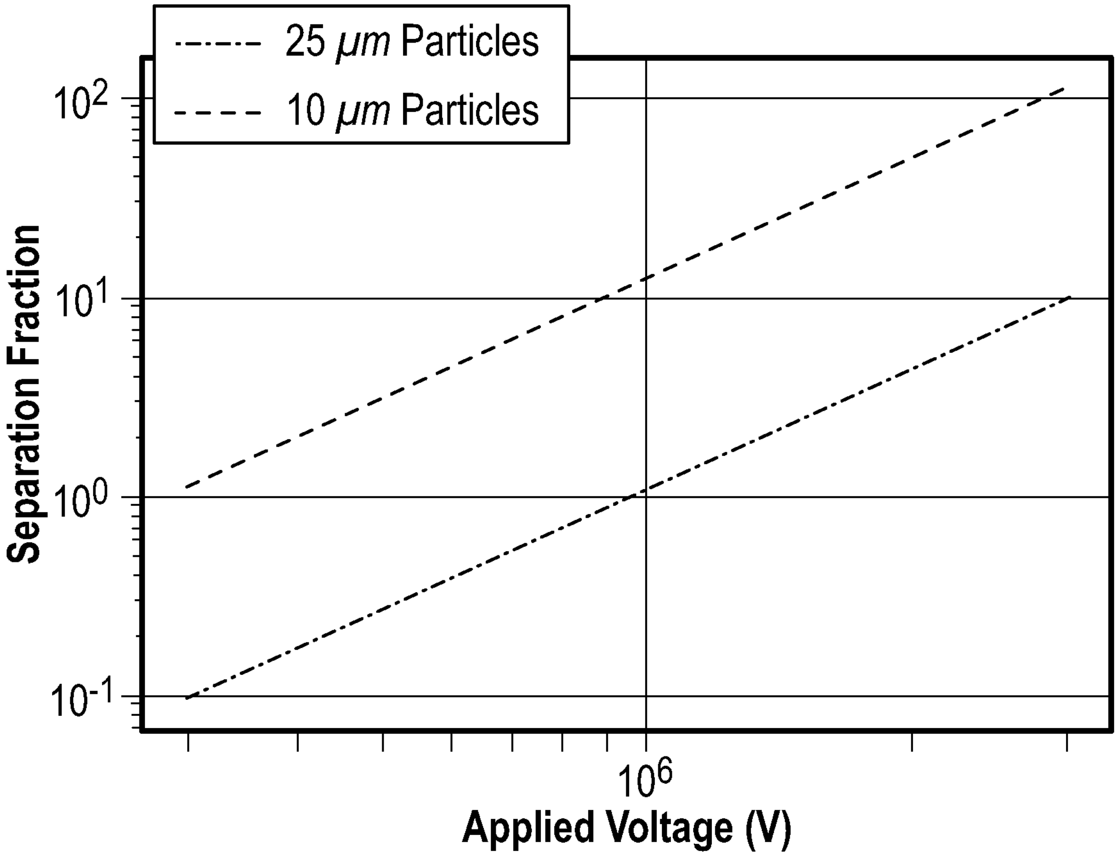
FIG. 8 is a logarithmic graph of the predicted separation fraction versus applied voltage (volts).

The predicted behavior of particles of various size with an electromagnetic separation stage of 1 or 2 meters in height is provided in FIG. 7. As shown in FIG. 7, the residence time of the particles decreases with a shorter column height and for a larger particle size. As shown in FIG. 8, the predicted particle behavior under increased applied voltage is a greater separation fraction for both particle sizes and a greater separation fraction for particles of 10 micrometers versus particles of 25 micrometers.

The provided mathematical model equations can be used to predict the residence time, particle size, and voltage parameters for the separation of particles by the disclosed methods. Thus, the models facilitate the tailoring of the electromagnetic field to improve particle separation. The disclosed system for separation of metallic powders and the disclosed method to separate contaminants from metallic powder provide versatile and tunable means to provide high purity metallic powders for manufacturing.

As used herein, the terms "about" and "substantially" are intended to include the degree of error associated with measurement of the particulate quantity based upon the equipment available at the time of filing the application. For example, the terms may include a range of ±8%, or 5%, or 2% of a given value or other percentage change as will be appreciated by those of skill in the art for the particulate measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. An electromagnetic field separation system for separation of metallic powders comprising:

a sample introducer for introducing a sample into an electromagnetic field generating system, wherein the sample to be introduced comprises particles; wherein the electromagnetic field generating system comprises:

a first separator, wherein the first separator is configured to provide a differential charge to the particles of the sample;

an electromagnetic separation stage comprising a second separator, wherein the second separator provides an electromagnetic field configured to separate the particles of the sample;

a gas impingement system, wherein the gas impingement system provides an increased residence time in the electromagnetic field generating system for the particles subjected to the electromagnetic field, and a recovery stage.

2. The system of claim 1, wherein the first separator is incorporated with the sample introducer.

3. The system of claim 1, wherein the first separator provides the differential charge by friction, conduction, induction, or a combination thereof.

4. The system of claim 1, wherein the first separator is configured to provide the differential charge by tribostatic charging, corona charging, or a combination thereof.

5. The system of claim 1, further comprising a cyclone separator.

6. The system of claim 1, further comprising a discharging stage, wherein the discharging stage is incorporated with the first separator, or after the first separator.

7. The system of claim 6, wherein the discharging stage includes a grounded wall.

8. The system of claim 1, further comprising a vacuum pump capable of providing a reduced pressure of 0.0001 Pascals to about 100,000 Pascals.

9. A method to separate contaminants from metallic powder comprising:

introducing a sample comprising particles to an electromagnetic field generating system, wherein the electromagnetic field generating system includes:

a first separator, wherein the first separator is configured to provide a differential charge to the particles of the sample, an electromagnetic separation stage comprising a second separator, wherein the second separator provides an electromagnetic field, a gas impingement system; and a recovery stage;

subjecting the sample to differential charging by the first separator to provide differentially charged particles; and subjecting the differentially charged particles to an electromagnetic field generated by the second separator, wherein the electromagnetic field provides electromagnetic separation of the differentially charged particles, wherein the differentially charged particles undergo the electromagnetic separation based on their electrostatic charge states, their paramagnetic properties, their ferromagnetic properties, or a combination thereof, and supplying a flow of inert gas in a first direction by the gas impingement system, and wherein the first direction is in an opposing direction to a direction of a powder particle flow; and increasing the residence time in the system for the differentially charged particles.

10. The method of claim 9, wherein the electromagnetic field is tuned to improve separation for a selected particle size and/or a sample type.

11. The method of claim 9, wherein the differentially charged particles comprise organic contaminants and the organic contaminants are removed from the differentially charged particles to provide a final material with less than 0.01 parts per million of the organic contaminants.

12. The method of claim 11, wherein the organic contaminants are off-chemistry metallic particles, non-metallic particles, or a combination thereof.

13. The method of claim 9, wherein the sample is introduced by a moving conveyor belt, a feed tube, a static surface, or a combination thereof.

14. The method of claim 9, wherein the subjecting the sample to differential charging by the first separator to provide the differentially charged particles and the subjecting the differentially charged particles to an electromagnetic field generated by the second separator; are performed in air, under an inert atmosphere, under a reduced pressure, or a combination thereof.

15. The method of claim 14, wherein the inert atmosphere is nitrogen, argon, or a combination thereof, wherein the reduced pressure is partial vacuum of 1,000 Pascals to 100,000 Pascals, or wherein the reduced pressure is a full vacuum of 0.0001 Pascals to 0.01 Pascals.

16. The method of claim 9, wherein the electromagnetic field generating system further comprises a cyclone separator, wherein the cyclone separator provides separation of the particles or separation of the differentially charged particles with air flow forces and electrostatic forces, wherein the cyclone separator provides the separation of the particles or the separation of the differentially charged particles before, after, or during the subjecting of the differentially charged particles to the electromagnetic field generated by the second separator.

17. The method of claim 9, wherein the electromagnetic field generating system further comprises a discharging stage, wherein subjecting the differentially charged particles to the discharging stage provides separation of the partially discharged particles and the charged particles.

18. The method of claim 17, wherein the discharging stage provides separation of the partially discharged particles and the charged particles prior to or during electromagnetic separation.

19. The method of claim 9, further comprising separating the particles of the sample by sieving before introducing the sample to an electromagnetic field;

separating the differentially charged particles by sieving during electromagnetic separation; or separating the particles of the sample by sieving after electromagnetic separation.

* * * * *